(12) United States Patent
Sasao (10) Patent No.: US 8,526,398 B2
(45) Date of Patent: Sep. 3, 2013

(54) COMMUNICATION TERMINAL AND COMMUNICATION METHOD

(75) Inventor: Nobuaki Sasao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1296 days.

(21) Appl. No.: 11/523,713

(22) Filed: Sep. 20, 2006

(65) Prior Publication Data

US 2007/0077893 A1   Apr. 5, 2007

(30) Foreign Application Priority Data

Sep. 21, 2005   (JP) .............................. P2005-274522

(51) Int. Cl.
*H04W 4/00* (2009.01)

(52) U.S. Cl.
USPC .......... 370/332; 370/310; 455/73; 455/553.1; 455/127.4

(58) Field of Classification Search
USPC ..................... 370/310; 455/73, 553.1, 127.4, 455/533.1
See application file for complete search history.

(56) References Cited

U.S. PATENT DOCUMENTS

| | | | |
|---|---|---|---|
| 5,950,127 A * | 9/1999 | Nitta et al. | 455/428 |
| 6,119,003 A * | 9/2000 | Kukkohovi | 455/435.2 |
| 6,181,952 B1 * | 1/2001 | Murata | 455/552.1 |
| 2002/0196755 A1 * | 12/2002 | Hidaka et al. | 370/335 |
| 2003/0008691 A1 * | 1/2003 | Chen et al. | 455/574 |
| 2003/0125028 A1 * | 7/2003 | Reynolds | 455/437 |
| 2004/0121768 A1 * | 6/2004 | Maki et al. | 455/432.1 |
| 2005/0018613 A1 * | 1/2005 | Yokota | 370/248 |
| 2005/0064825 A1 * | 3/2005 | Forrester | 455/101 |

FOREIGN PATENT DOCUMENTS

| | | |
|---|---|---|
| EP | 1 465 451 A2 | 10/2004 |
| JP | 2003-153325 | 5/2003 |
| JP | 2004-96707 | 3/2004 |
| JP | 2004-235976 | 8/2004 |
| JP | 2004-349863 | 12/2004 |
| WO | WO 01/47316 A2 | 6/2001 |
| WO | WO 02/01807 A2 | 1/2002 |
| WO | WO 2004/079968 | 9/2004 |

OTHER PUBLICATIONS

Office Action dated Oct. 5, 2010, in Japanese Patent Application P2005-274522, drafting date Oct. 1, 2010 (with English translation).

* cited by examiner

*Primary Examiner* — Kamran Afshar
*Assistant Examiner* — Shahriar Behnamian
(74) *Attorney, Agent, or Firm* — Oblon, Spivak, McClelland, Maier & Neustadt, L.L.P.

(57) ABSTRACT

An object of the present invention is to provide a communication terminal and a communication method that can reduce power consumption while securing a communication state by a first communication means or a second communication means.
A mobile device includes a radio communication part that communicates and connects with a mobile communication network and a WLAN communication part that communicates and connects with a WLAN. In the mobile device, a communication state monitoring part judges whether or not a radio communication using the radio communication part can be performed based on a preset reference value. When the communication state monitoring part judges that the communication using the radio communication part can be performed, a control part causes the WLAN communication part to transit to a sleep state.

9 Claims, 6 Drawing Sheets

COMMUNICATION TERMINAL AND COMMUNICATION METHOD

BACKGROUND OF THE INVENTION

1. Field of the Invention

The present invention relates to a communication apparatus and a communication method that communicates and connects with a plurality of communication networks.

2. Related Background Art

A mobile device having a mobile communication function defined by international standards such as IMT (International Mobile Telecommunications)-2000 and a wireless LAN communication function that can perform wireless communication with an access point, as described, for example, in Japanese Patent Application Laid-Open No. 2004-235976 (Patent Document 1) have been known. In this Patent Document 1, selective use of the mobile communication function and the wireless LAN communication function depending on a location of the mobile device is described.

[Patent Document 1] Japanese Patent Application Laid-Open No. 2004-235976

However, since the mobile device operates with a built-in battery, when the mobile communication function and the wireless LAN communication function are caused to be in an active state, the battery will soon run out even if the mobile device is in a standby mode without performing a communication in the active state. Particularly, power consumption of the wireless LAN communication function is large and the battery is sometimes significantly consumed even if a power management feature called a power save mode is used.

Then, to solve the above-described problem, an object of the present invention is to provide a communication terminal and a communication method that can reduce power consumption while securing a communication state by either a first communication means or a second communication means.

SUMMARY OF THE INVENTION

To solve the above-described problem, a communication terminal according to the present invention comprises a first communication means for performing a communication by a first communication system, a second communication means for performing a communication by a second communication system, a judgment means for judging whether or not a communication using the first communication means can be performed based on a preset value, and a control means for controlling the second communication means so that an active state of the second communication means is stopped when the judgment means judges that the communication using the first communication means can be performed, and the active state of the second communication means is continued when the judgment means judges that the communication using the first communication means cannot be performed.

Also, a communication method according to the present invention, in a communication method of a communication terminal having a first communication means for performing a communication by a first communication system and a second communication means for performing a communication by a second communication system, comprises: a judgment step judging whether or not the communication using the first communication means can be performed based on a preset value; and a control step controlling the second communication means so that an active state of the second communication means is stopped when the judgment step judges that the communication using the first communication means can be performed, and the active state of the second communication means is continued when the judgment step judges that the communication using the first communication means cannot be performed.

According to the present invention, the communication terminal has the first communication means for performing a communication by the first communication system and the second communication means for performing a communication by the second communication system, judges whether or not a communication using the first communication means can be performed based on a preset value, and can control the second communication means so that an active state of the second communication means is stopped when a judgment is made that the communication using the first communication means can be performed and the active state of the second communication means is continued when a judgment is made that the communication using the first communication means cannot be performed. Since this makes it possible to stop the active state of the second communication means when the communication using the first communication means can be performed, power consumption by the active state of the second communication means can be reduced while securing a communication state.

Also, the judgment means of the communication terminal according to the present invention is preferably constructed to judge whether or not the communication using the first communication means can be performed based on whether or not radio field intensity detected by the first communication means is equal to or greater than a preset value or a packet loss value detected by the first communication means is equal to or smaller than a setting value.

According to the present invention, whether or not the communication using the first communication means can be performed can be judged based on whether or not the radio field intensity detected by the first communication means is equal to or greater than a preset value or whether or not a packet loss value detected by the first communication means is equal to or smaller than a setting value. This makes it possible to judge whether or not the communication using the first communication means can be performed with high precision and to reduce power consumption by the active state of the second communication means.

Also, when the judgment means of the communication terminal according to the present invention judges that a communication using the first communication means can be performed, the judgment means preferably further judges whether or not the communication using the first communication means can be performed by predicting a future communication state by the first communication means.

According to the present invention, when a judgment is made that a communication using the first communication means can be performed, whether or not the communication using the first communication means can be performed is further judged by predicting a future communication state. This makes it possible to judge, though a communication can be performed at this time, whether or not a communication can be performed based on a result of predicting a future communication state and to reduce power consumption while securing a communication state.

Also, the judgment means of the communication terminal according to the present invention preferably predicts a future communication state based on a history of the radio field intensity or the packet loss value detected by the first communication means.

According to the present invention, a future communication state can be predicted based on a history of the radio field intensity or the packet loss value detected by the first communication means. This makes it possible to predict a future communication state with high precision.

According to the present invention, since an active state of the second communication means can be stopped when a communication using the first communication means can be performed, power consumption by the active state of the second communication means can be reduced while securing a communication state.

DESCRIPTION OF THE PREFERRD EMBODIMENTS

The present invention can easily be understood by considering a detailed description shown below with reference to attached drawings shown for an embodiment. Subsequently, the embodiment according to the present invention will be described with reference to the attached drawings. The same numeral references will be attached to the same components if possible to omit a duplicate description.

Figure 1:
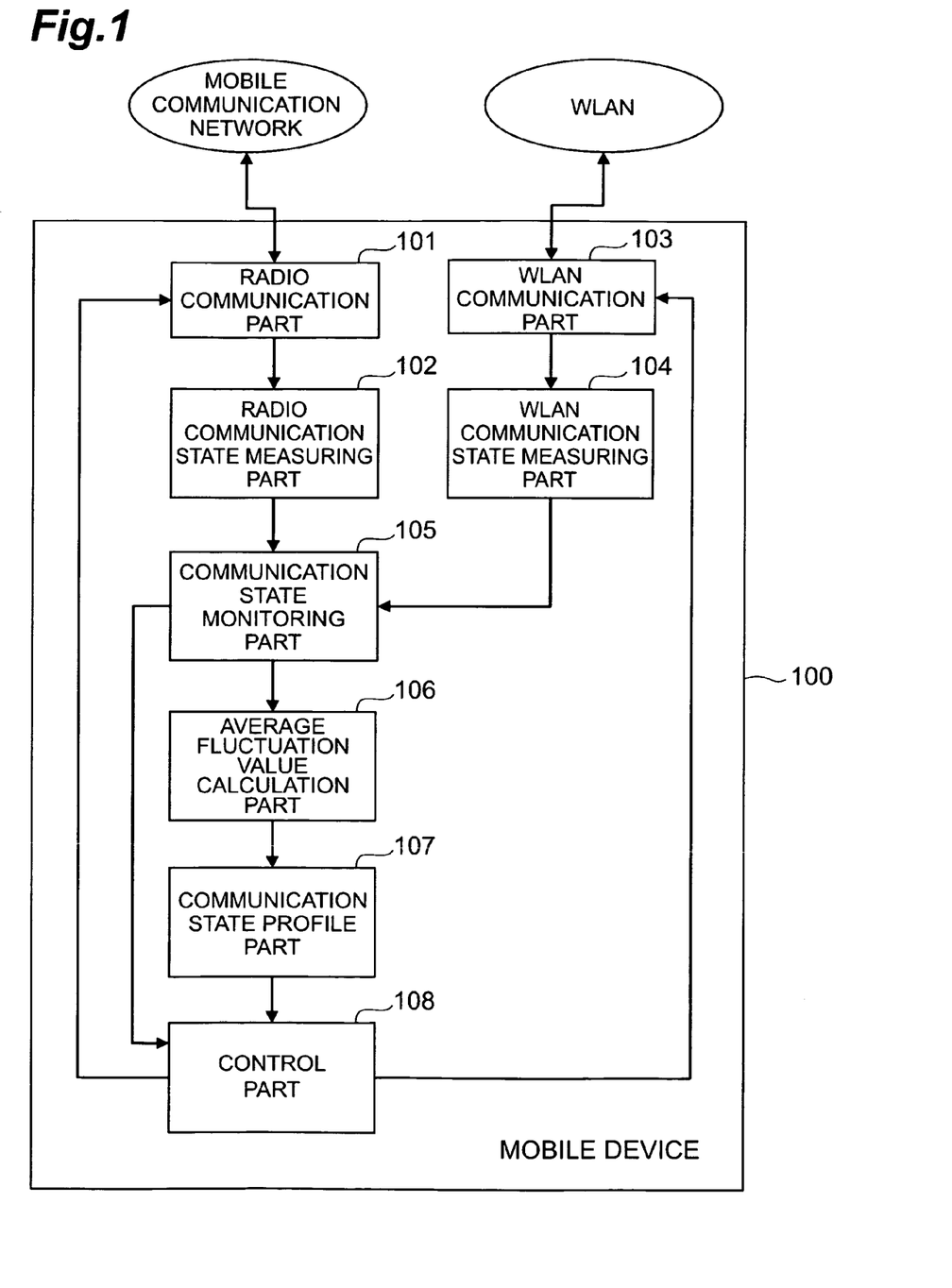
FIG. 1 is a block diagram of a mobile device 100 according to the present embodiment.

FIG. 1 is a block diagram of a mobile device 100 according to the present embodiment. The mobile device 100 is comprised of hardware such as a communication module, a CPU, and a memory, and comprises a radio communication part 101 (a first communication means or a second communication means), a radio communication state measuring part 102, a WLAN communication part 103 (a first communication means or a second communication means), a WLAN communication state measuring part 104, a communication state monitoring part 105 (a judgment means), an average fluctuation value calculation part 106, a communication state profile part 107 (a judgment means), and a control part 108 (a control means). Each component will be described below.

The radio communication part 101 is a part that communicates and connects with a mobile communication network and can communicate with a communications partner according to a communication method, for example, defined by an international standard IMT-2000. A voice signal or packet data obtained by the radio communication part 101 is processed by a signal processing part (not shown) or the like for voice or data processing. When receiving a voice signal or packet data, the radio communication part 101 outputs received radio wave signals to the radio communication state measuring part 102.

The radio communication state measuring part 102 is a part that observes a radio communication state by the radio communication part 101 to measure the communication state that shows whether or not a radio communication can be performed satisfactorily. More specifically, the radio communication state measuring part 102 measures intensity of radio wave, that is, a reception level (in dBm) of the radio wave received by the radio communication part 101. The radio communication state measuring part 102 outputs state information showing a measured communication state to the communication state monitoring part 105. Here, the radio communication state measuring part 102 may also measure the communication state that shows whether or not a radio communication can be performed satisfactorily by measuring a packet loss value of packet data received via a mobile communication network. Note that, a packet loss value is numerical data showing the number of packets that failed to receive from among all packet data to be received.

The WLAN (Wireless Local Area Network) communication part 103 is a part that communicates and connects with an access point of WLAN and can communicate, for example, by a communication method defined by IEEE802.11. A voice signal or packet data obtained by the WLAN communication part 103 is processed by a signal processing part (not shown) or the like for voice or data processing. When receiving a voice signal or packet data, the WLAN communication part 103 outputs received radio wave signals to the WLAN communication state measuring part 104.

The WLAN communication state measuring part 104 is a part that observes a WLAN communication state by the WLAN communication part 103 to measure the communication state that shows whether or not a WLAN communication can be performed satisfactorily. More specifically, the WLAN communication state measuring part 104 measures intensity of radio waves, that is, the reception level (in dBm) of radio wave received by the WLAN communication part 103. The WLAN communication state measuring part 104 may also measure a packet loss value of packet data received via WLAN. The WLAN communication state measuring part 104 outputs state information (for example, measured intensity of radio wave or a packet loss value) showing a measured communication state to the communication state monitoring part 105.

The communication state monitoring part 105 is a part that monitors state information (for example, intensity of radio waves or a packet loss value) that shows a communication state output by the radio communication state measuring part 102 or the WLAN communication state measuring part 104. More specifically, the communication state monitoring part 105 stores output radio field intensity (or a packet loss value) for each output and outputs the stored radio field intensity (or the packet loss value) to the average fluctuation value calculation part 106. If the radio field intensity is equal to or greater than a preset value (or the packet loss value is equal to or smaller than a preset value), the communication state monitoring part 105 performs a control operation to cause the average fluctuation value calculation part 106 and the communication state profile part 107 to predict whether or not a communication state when checked next time will be satisfactory.

If the radio field intensity measured by the radio communication state measuring part 102 or the WLAN communication state measuring part 104 is equal to or greater than a preset value (or the packet loss value is equal to or smaller than a preset value) when the radio communication part 101 or the WLAN communication part 103 starts a communication, the communication state monitoring part 105 may output that effect to the control part 108. In this case, the control part 108 performs a control operation to cause either of communication parts (either the radio communication part 101 or the WLAN communication part 103) that is not communicating to transit to a sleep state.

The average fluctuation value calculation part 106 is a part that calculates an average fluctuation value indicating trend of increase or decrease of the radio field intensity (or the packet loss value) based on a history of the radio field intensity (or the packet loss value) output by the communication state monitoring part 105. The average fluctuation value calculation part 106 outputs the calculated average fluctuation value to the communication satate profile part 107.

The communication state profile part 107 is a part that predicts whether or not a future communication state is getting better or worse based on an average fluctuation value output by the average fluctuation value calculation part 106. More specifically, the communication state profile part 107 is a part that predicts whether or not radio field intensity (or a packet loss value) is in an increase or decrease trend, or remains constant. Besides, a decrease trend in which radio field intensity decreases imperceptibly may be ascribed as a constant and an increase trend in which the packet loss value increases imperceptibly may be ascribed as a constant. Then, if the communication state profile part 107 judges that the radio field intensity is in an increase trend or the packet loss value is in a decrease trend, the communication state profile part 107 outputs an instruction signal to indicate that effect to the control part 108.

When, for example, the radio field intensity is in a decrease trend or the packet loss value is in an increase trend, the communication state profile part 107 predicts the trend of communication state based on the radio field intensity or the packet loss value measured by the radio communication state measuring part 102. When the communication state profile part 107 judges that radio field intensity of radio waves that will be transmitted and received will be equal to or smaller than a preset value (or a packet loss value will be equal to or greater than a setting value), the communication state profile part 107 outputs an instruction signal to the control part 108 to start preparations for performing a communication using the WLAN communication part 103. Besides, the communication state profile part 107 may also give instructions to start preparations for performing a communication using the radio communication part 101 by predicting a communication state of the WLAN communication part 103.

The control part 108 is a part which an instruction signal indicating a trend of radio field intensity (or a packet loss value) output by the communication state profile part 107 is input into and the radio communication part 101 or the WLAN communication part 103 is controlled based on the trend indicated by the instruction information. More specifically, if instruction information indicating that the radio field intensity is in an increase trend or remains constant while the radio communication part 101 is communicating (or on standby) is input, the control part 108 performs a control operation to cause the WLAN communication part 103 to transit to the sleep state. Also, if instruction information indicating that the radio field intensity is in an increase trend or remains constant while the WLAN communication part 103 is communicating (or on standby) is input, the control part 108 performs a control operation to cause the radio communication part 101 to transit to the sleep state. Here, the sleep state is a state in which an active state is stopped and, more specifically, a state in which the radio communication part 101 or the WLAN communication part 103 is not energized and no power is supplied.

Also, when the control part 108 can judge that, based on a trend of radio field intensity (or a packet loss value) output by the communication state profile part 107, the communication part that is currently communicating is in a poor communication state, the control part 108 performs preparation processing so that communication using the other communication part can be performed. Particularly, to cause the WLAN communication part 103 to communicate, processing such as searching for a connection destination to which it belongs or the like in advance is needed.

If the information that radio field intensity measured by the radio communication state measuring part 102 or the WLAN communication state measuring part 104 is equal to or greater than a preset value (or the information that a packet loss value is equal to or smaller than a preset value) is input from the communication state monitoring part 105 when the radio communication part 101 or the WLAN communication part 103 starts a communication, the control part 108 performs a control operation to cause the radio communication part 101 or the WLAN communication part 103 to transit to the sleep state. That is, if the measured radio field intensity is equal to or greater than a preset value when the communication is started by the radio communication part 101 (or on standby), the control part 108 performs a control operation to cause the WLAN communication part 103 to transit to the sleep state, and if the measured radio field intensity is equal to or greater than a preset value when the communication is started by the WLAN communication part 103 (or on standby), the control part 108 performs a control operation to cause the radio communication part 101 to transit to the sleep state.

The mobile device 100 thus constructed can cause the radio communication part 101 or the WLAN communication part 103 that has not started a communication or is not in communication to transit to the sleep state based on radio field intensity or a packet loss value.

Figure 2:
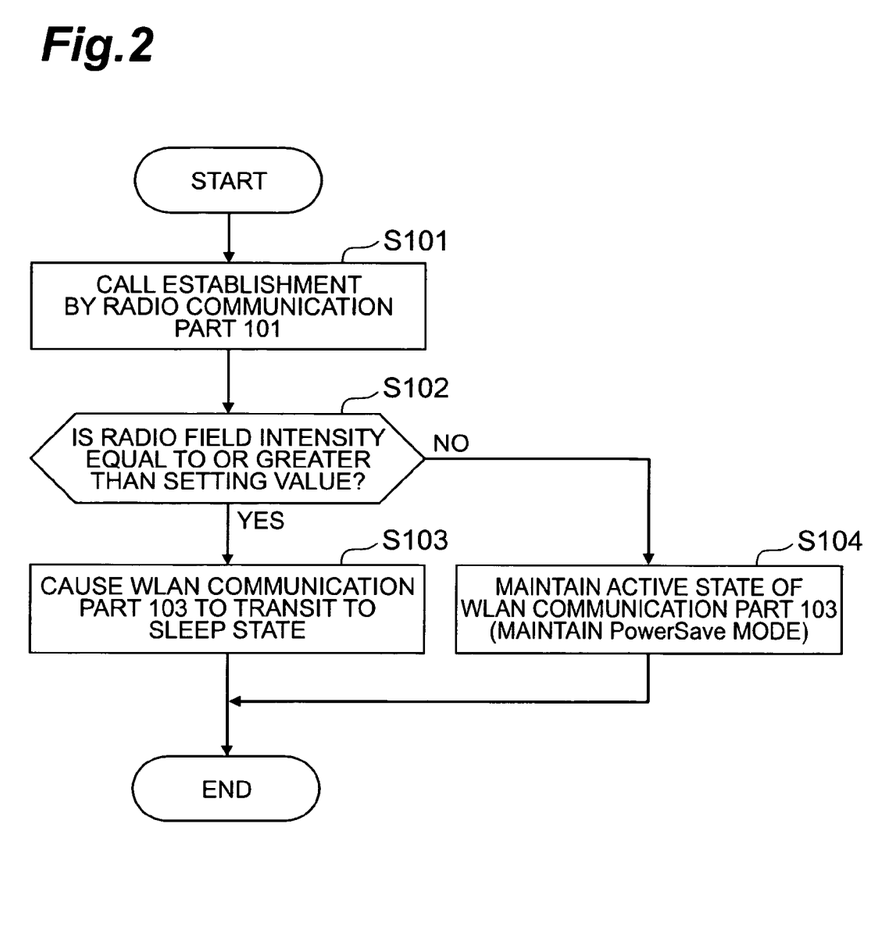
FIG. 2 is a flow chart showing an operation of the mobile device 100 when a WLAN communication part 103 is caused to transit to a sleep state at a start time of communication.

Next, an operation of the mobile device 100 when a call is started will be described. FIG. 2 is a flow chart showing the operation when the WLAN communication part 103 is caused to transit to the sleep state at a start time of communication. Though radio field intensity is used as a parameter for measuring a communication state for description, similar processing can also be performed when a packet loss value is used.

A communication is started by the radio communication part 101 and a conversation state is established (S101). Then, radio field intensity of the communication by the radio communication part 101 is measured by the radio communication state measuring part 102 and whether or not the radio field intensity is equal to or greater than a preset value is monitored by the communication state monitoring part 105. If a judgment is made by the communication state monitoring part 105 that the radio field intensity is equal to or greater than the preset value (S102), the information is output to the control part 108 and the control part 108 outputs a control signal so that a function of the WLAN communication part 103 is stopped and a power supply is in a no-supply state, that is, the WLAN communication part 103 is caused to transit to the sleep state. When the WLAN communication part 103 receives the control signal, transition of the WLAN communication part 103 to the sleep state takes place (S103).

When a packet loss value is used, processing shown below may be performed: to proceed to S103 if the packet loss value is equal to or smaller than a preset value and to proceed to S104 if the packet loss value is greater than the preset value.

If a judgment is made by the communication state monitoring part 105 that radio field intensity is neither equal to nor greater than a preset value (S102), the information is output to the control part 108 and the control part 108 outputs a control signal so that the WLAN communication part 103 is maintained in a current state (or a power save mode) (S104). Or, the control signal to maintain the current state may be made not to be output.

When a call is established by the radio communication part 101, as described above, the mobile device 100 in the present embodiment can cause the WLAN communication part 103 to transit to the sleep state based on radio field intensity. Or, when a communication is established by the WLAN communication part 103, the radio communication part 101 may be caused to transit to the sleep state based on radio field intensity. Though the above description is illustrated as processing during a call or when a conversation state is established, similar processing can also be performed when waiting for an incoming call.

Figure 3:
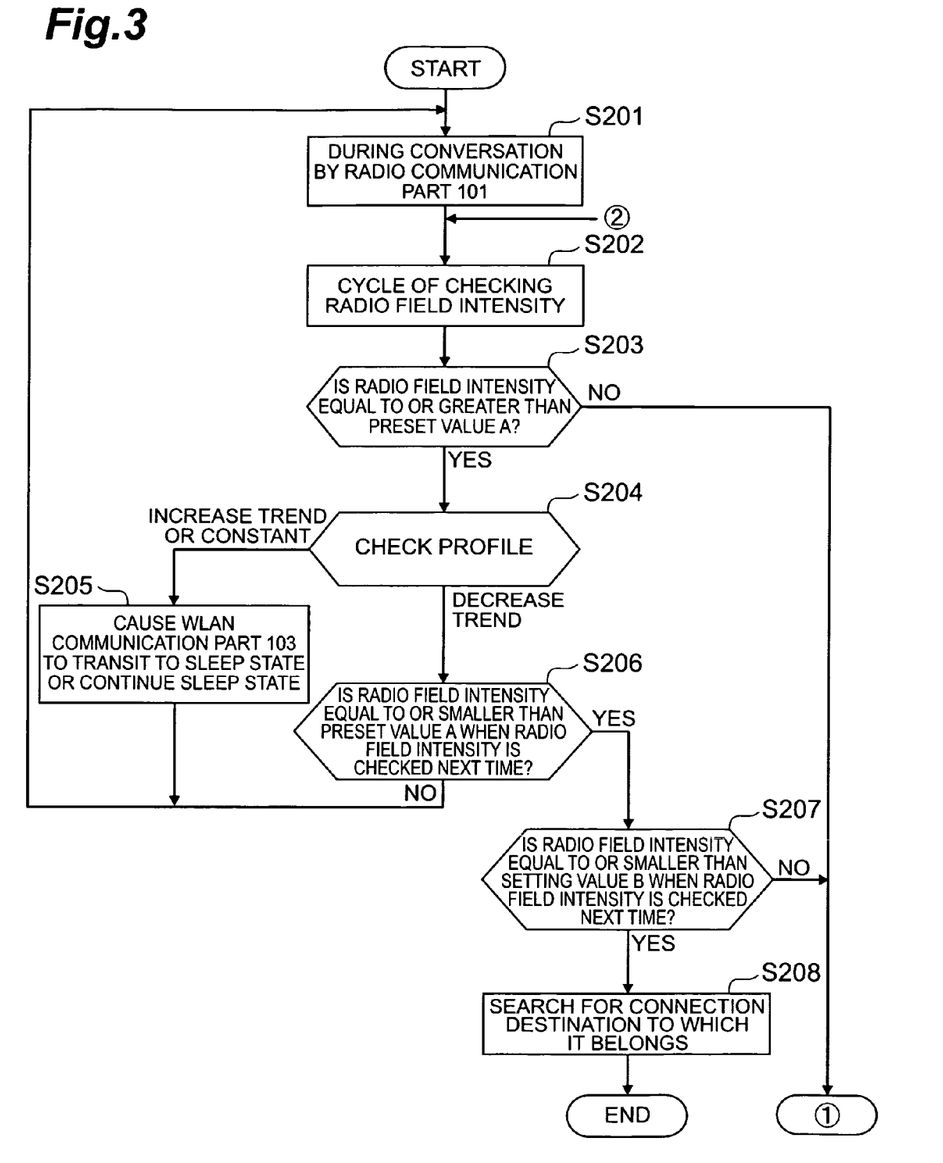
FIG. 3 is a flow chart showing the operation of the mobile device 100 when the WLAN communication part 103 is caused to transit to the sleep state during a call.

Next, an operation when the WLAN communication part 103 is caused to transit to the sleep state by predicting a future communication state (radio field intensity) from a current communication state (radio field intensity) will be described. FIG. 3 is a flow chart showing the operation when the WLAN communication part 103 is caused to transit to the sleep state during a call (or waiting for an incoming call) of the mobile device 100.

When a call is made (or communication is performed) by the radio communication part 101 (S201), radio field intensity of the communication by the radio communication part 101 is checked by the communication state monitoring part 105 (S202). Or, confirmation processing of radio field intensity may be performed when waiting for an incoming call. Then, whether or the radio field intensity monitored by the communication state monitoring part 105 is equal to or greater than a preset value A is judged by the communication state monitoring part 105 (S203).

When, here, a judgment is made by the communication state monitoring part 105 that radio field intensity is neither equal to nor greater than the preset value A (S203), the processing proceeds to S301. Processing in S301 and thereafter will be described later. Also, when a judgment is made by the communication state monitoring part 105 that radio field intensity is equal to or greater than the preset value A (S203), an average fluctuation value indicating an increase/decrease trend of radio field intensity based on a history of the radio field intensity is calculated by the average fluctuation value calculation part 106 and a profile of increase/decrease in radio field intensity is checked by the communication state profile part 107 (S204). If a judgment is made by the communication state profile part 107 in S204 that radio field intensity is in an increase trend or remains constant, the WLAN communication part 103 is controlled by the control part 108 so that power supply to the WLAN communication part 103 is cut off and a function thereof is stopped to cause the WLAN communication part 103 to transit from an active state to a sleep state (S205). If the WLAN communication part 103 is already in the sleep state, the sleep state is continued. Then, after returning to S201, radio field intensity is checked again at predetermined intervals.

In addition, when a judgment is made by the communication state profile part 107 in S204 that radio field intensity is in a decrease trend, a judgment is made by the communication state profile part 107 whether or not the radio field intensity measured when the radio field intensity is checked next time will be equal to or smaller than the preset value A based on a decrease average value (S206). When, here, a judgment is made that the radio field intensity measured next time will be neither equal to nor smaller than the preset value A, no processing is performed before returning to S201. When a judgment is made by the communication state profile part 107 that the radio field intensity is equal to or smaller than the preset value A, whether or not the radio field intensity is equal to or smaller than a setting value B, which is smaller than the preset value A, is further judged by the communication state profile part 107 (S207).

When a judgment is made in S207 by the communication state profile part 107 that the radio field intensity is equal to or smaller than the setting value B, which is set smaller than the preset value A, a control operation is performed so that search processing of a connection destination to which the WLAN communication part 103 is belonging, that is, communication connection processing to an access point is performed (S208). When a judgment is made by the communication state profile part 107 that the radio field intensity is neither equal to nor smaller than the setting value B, which is set smaller than the preset value A, the processing proceeds to S301 to perform a control operation so that the function of the WLAN communication part 103 is turned on (active state) or the ON state is continued.

Figure 4:
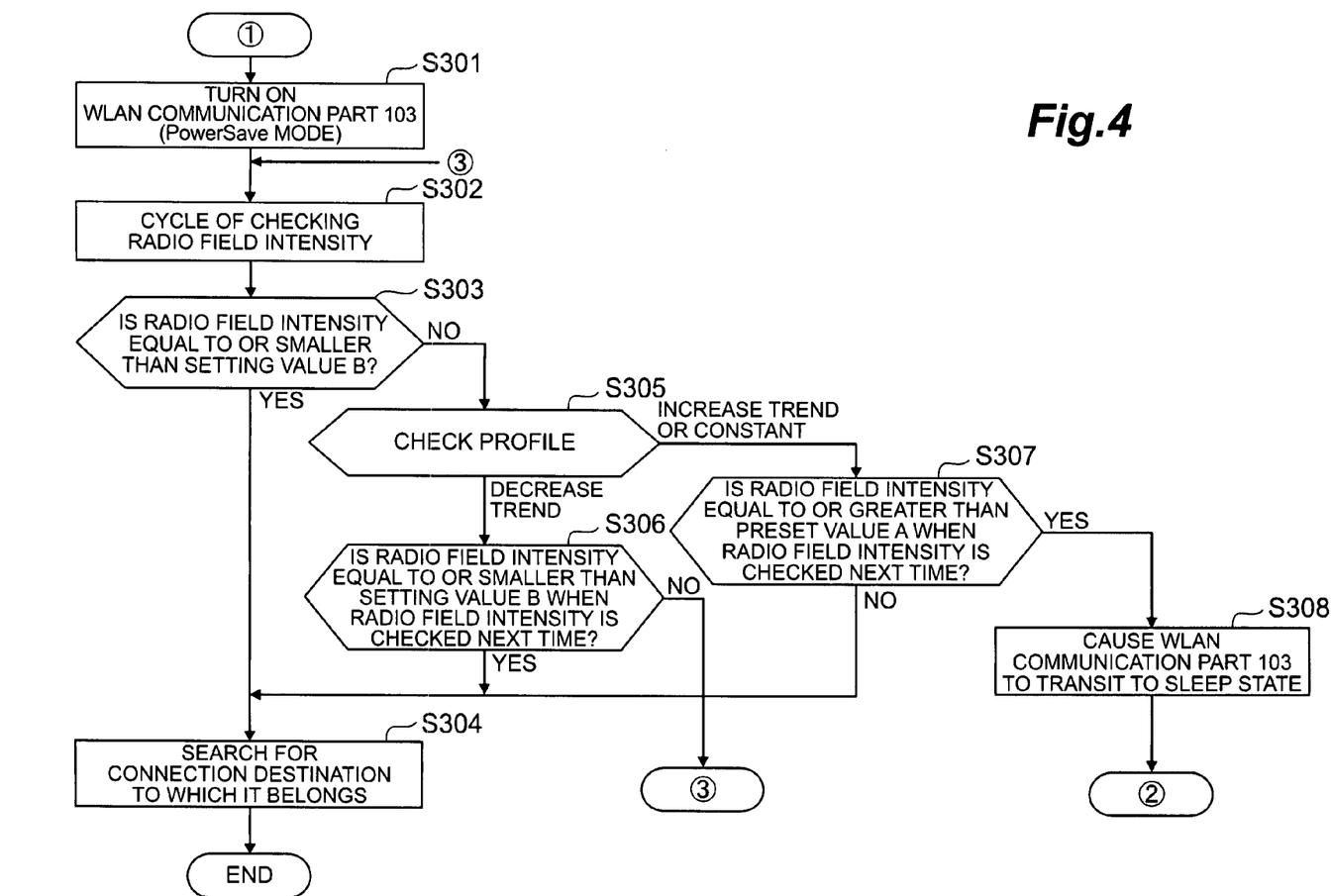
FIG. 4 is a flow chart showing the operation of the mobile device 100 when performing reconfirmation processing for causing the WLAN communication part 103 to transit to the sleep state.

Next, an operation of the mobile device 100 when a judgment is made that the radio field intensity is neither equal to nor greater than the preset value A in S203, or neither equal to nor smaller than the setting value B in S207 will be described. FIG. 4 is a flow chart showing the operation of the mobile device 100 when a judgment is made that the radio field intensity is neither equal to nor greater than the preset value A in S203, or neither equal to nor smaller than the setting value B in S207 and reconfirmation processing is performed to cause the WLAN communication part 103 to transit to the sleep state.

When a judgment is made that the radio field intensity is neither equal to nor greater than the preset value A in S203, or neither equal to nor smaller than the setting value B in S207, the WLAN communication part 103 is turned on (active state) or the ON state is continued (S301). Incidentally, the WLAN communication part 103 is preferably in a power save mode. Here, the power save mode is a mode in which the active state and the sleep state alternate. Then, when a cycle comes to a state of checking radio field intensity of communication by the radio communication part 101 (S302), a judgment is made by the communication state monitoring part 105 whether or not the radio field intensity of communication by the radio communication part 101 is equal to or smaller than the setting value B (S303). When a judgment is made by the communication state monitoring part 105 that the radio field intensity is equal to or smaller than the setting value B, search processing of a connection destination to which the WLAN communication part 103 belongs, that is, a communication connection processing to an access point is performed to enable communication by the WLAN communication part 103 (S304).

When a judgment is made by the communication state monitoring part 105 that the radio field intensity is neither equal to nor smaller than the setting value B in S303, an average fluctuation value indicating an increase/decrease trend of radio field intensity based on a history of the radio field intensity is calculated by the average fluctuation value calculation part 106 and, based on the average fluctuation value, a profiling check is performed by the communication state profile part 107 (S305). If, as a result of profiling check by the communication state profile part 107, the radio field intensity is in a decrease trend, a judgment is made by the communication state profile part 107 whether or not the radio field intensity will be equal to or smaller than the setting value B when the radio field intensity is checked next time (S306).

When a judgment is made by the communication state profile part 107 that radio field intensity when checked next time will be equal to or smaller than the setting value B in S306, search processing of a connection destination to which the WLAN communication part 103 belongs, that is, a communication connection processing to an access point is performed to enable communication by the WLAN communication part 103 (S304). When a judgment is made by the communication state profile part 107 that the radio field intensity when checked next time will be neither equal to nor smaller than the setting value B in S306, the processing returns to S302 and repeats the above processing in a cycle of checking radio field intensity.

When, as a result of the profile check by the communication state profile part 107, the radio field intensity is in an increase trend or remains constant (an imperceptible decrease trend may be included) in S305, a judgment is further made by the communication state profile part 107 whether or not radio field intensity when checked next time will be equal to or greater than the preset value A (S307). When, here, a judgment is made by the communication state profile part 107 that radio field intensity when checked next time will be equal to or greater than the preset value A, the WLAN communication part 103 is controlled by the control part 108 so that power supply to the WLAN communication part 103 is cut off and the WLAN communication part 103 is caused to transit to the sleep state (S308). Tine processing proceeds to S202 via S308 to repeat the above processing. When a judgment is made by the communication state profile part 107 that radio field intensity when checked next time will be neither equal to nor greater than the preset value A, the processing proceeds to S304 to perform search processing of a connection destination to which the WLAN communication part 103 belongs (S304).

Figure 5:
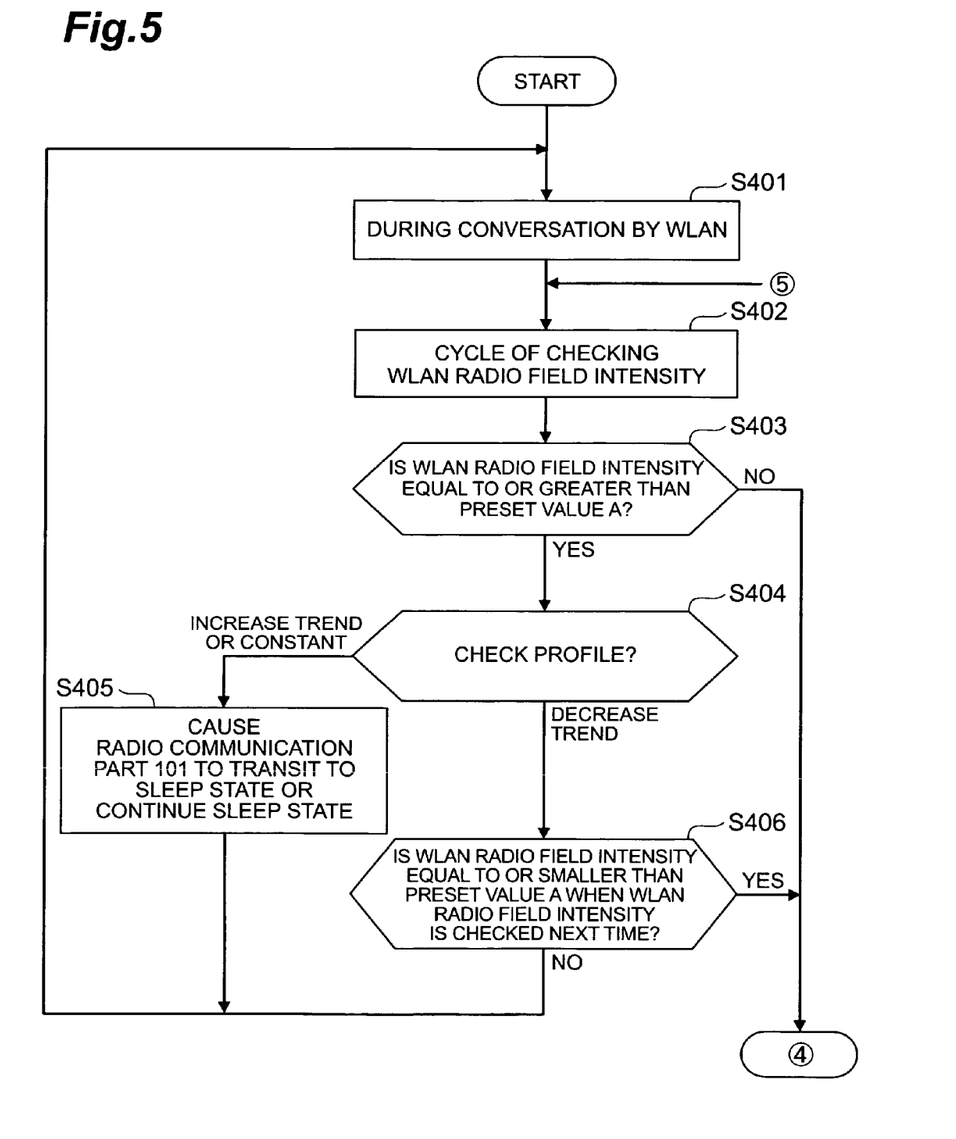
FIG. 5 is a flow chart showing the operation of the mobile device 100 when a radio communication part 101 is caused to transit to a sleep state during a call.

Next, an operation when the radio communication part 101 is caused to transit to the sleep state based on radio field intensity during a communication (or when waiting for incoming packet data) of the mobile device 100 will be described. FIG. 5 is a flow chart showing the operation when the radio communication part 101 is caused to transit to the sleep state during a call of the mobile device 100.

A call by the WLAN communication part 103 is being performed (S401). Or, the WLAN communication part 103 may be waiting for an incoming call. If a cycle of checking radio field intensity of WLAN communication comes during a call (or when waiting for incoming packet data) (S402), a judgment is made by the communication state monitoring part 105 whether or not the radio field intensity of WLAN communication is equal to or greater than the preset value A (S403). When, here, a judgment is made by the communication state monitoring part 105 that the radio field intensity is neither equal to nor greater than the preset value A, the processing proceeds to S501. Processing in S501 and thereafter will be described later.

When a judgment is made by the communication state monitoring part 105 that the radio field intensity is equal to or greater than the preset value A, a profile check is performed by the communication state profile part 107 (S404). More specifically, an average fluctuation value of an increase/decrease trend in a history of the radio field intensity is calculated by the average fluctuation value calculation part 106 and, based on the average value, whether future radio field intensity is in an increase trend or remains constant (an imperceptible decrease trend may be included), or is on a decrease trend is judged (S404). When, here, a judgment is made by the communication state profile part 107 that the radio field intensity is on an increase trend or remains constant, power supply to the radio communication part 101 is cut off and a function thereof is stopped to cause the radio communication part 101 to transit to the sleep state (S405). Besides, when the radio communication part 101 is already in the sleep state, the state thereof is continued.

Further, when a judgment is made by the communication state profile part 107 that the radio field intensity is in a decrease trend in S404, a judgment is made by the communication state profile part 107 whether or not radio field intensity when the radio field intensity is checked next time will be equal to or smaller than the preset value A (S406). When, here, a judgment is made by the communication state profile part 107 that radio field intensity when checked next time will be equal to or smaller than the preset value A, the processing proceeds to S501. When a judgment is made by the communication state profile part 107 that radio field intensity when checked next time will be neither equal to nor smaller than the preset value A, the processing returns to S401 to repeat the above processing.

As described above, the mobile device 100 can cut off power supply to the radio communication part 101 during WLAN communication (or when waiting for an incoming call) by the WLAN communication part 103 based on radio field intensity thereof to stop a function of the radio communication part 101.

Figure 6:
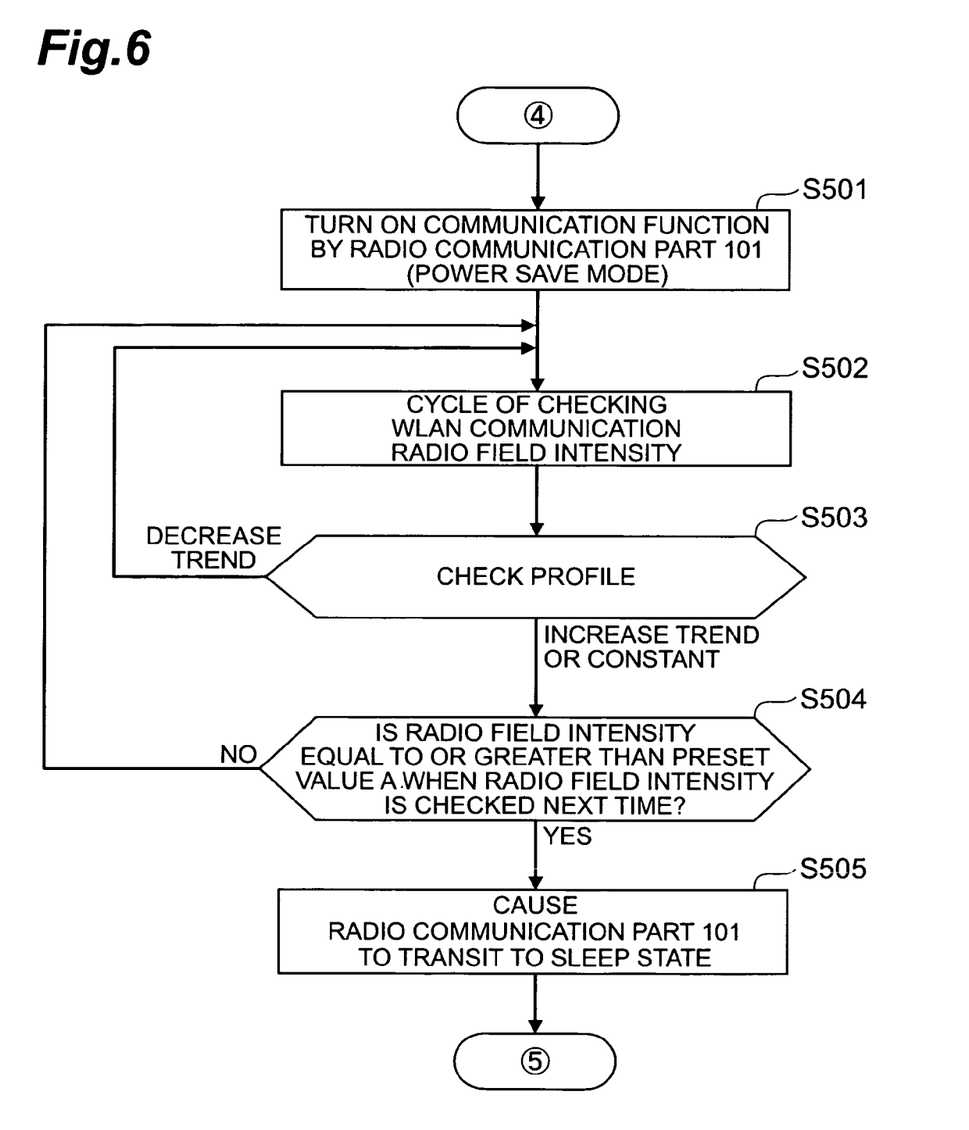
FIG. 6 is a flow chart showing the operation of the mobile device 100 when performing reconfirmation processing for causing the radio communication part 101 to transit to the sleep state.

Next, processing when a judgment is made by the communication state profile part 107 that radio field intensity checked next time will be equal to or smaller than the preset value A in S406 or a judgment is made by the communication state profile part 107 that radio field intensity in WLAN communication is neither equal to nor greater than the preset value A in S403 will be described. FIG. 6 is a flow chart showing the operation of the mobile device 100 when a judgment is made by the communication state profile part 107 that radio field intensity checked next time will be equal to or smaller than the preset value A in S406 or a judgment is made by the communication state profile part 107 that radio field intensity in WLAN communication is neither equal to nor greater than the preset value A in S403 and reconfirmation processing is performed to cause the radio communication part 101 to transit to the sleep state.

First, the communication function of the radio communication part 101 is turned on (active state) (S501). Incidentally, the radio communication part 101 is preferably in a power save mode. When the communication function by the radio communication part 101 is already in an ON state (active state), the ON state will be continued. Then, when a cycle of checking radio field intensity of communication by the WLAN communication part 103 comes (S502), an average fluctuation value indicating an increase/decrease trend of radio field intensity based on a history of the radio field intensity is calculated by the average fluctuation value calculation part 106 and, based on the calculated average fluctuation value, a profiling check is performed by the communication state profile part 107. More specifically, whether future radio field intensity is in an increase trend or remains constant (an imperceptible decrease trend may be included), or is in a decrease trend is judged by the communication state profile part 107 (S503).

When a judgment is made by the communication state profile part 107 that the radio field intensity is in a decrease trend (S503), the processing returns to S502 to repeat the above processing. Further, when a judgment is made by the communication state profile part 107 that the radio field intensity is in an increase trend or remains constant, a judgment is made by the communication state profile part 107 whether or not radio field intensity when the radio field intensity is checked next time will be equal to or greater than the preset value A (S504). When, here, a judgment is made by the communication state profile part 107 that radio field intensity when checked next time will be neither equal to nor greater than the preset value A, the processing returns to S502 to repeat the above processing. When a judgment is made by the communication state profile part 107 that radio field intensity when checked next time will be equal to or greater than the preset value A, power supply to the radio communication part 101 is cut off and the radio communication function is stopped to cause the radio communication part 101 to transit to the sleep state (S505). Then, after returning to S402 shown in FIG. 5 to perform the above processing repeatedly.

Note that though the radio field intensity has been used as a parameter for measuring the above communication state for description, similar processing can also be performed when a packet loss value is used. However, when the packet loss value is used, processing of the radio field intensity must be reversed. More specifically, in S102 of FIG. 2, whether or not the packet loss value is equal to or smaller than a setting value is judged. Processing must be changed to proceed to S103 when the packet loss value is equal to or smaller than the setting value and to proceed to S104 when the packet loss value is neither equal to nor smaller than the setting value. In addition, similar judgment processing using the packet loss value can be performed in S203, S206, and S207 of FIG. 3, S303, S306, and S307 of FIG. 4, S403 and S406 of FIG. 5, and S504 of FIG. 6.

Next, operation effects of the mobile device 100 in the present embodiment will be described. The mobile device 100 has the radio communication part 101 that can communicate and connect with a mobile communication network and the WLAN communication part 103 that can communicate and connect with a WLAN, and the communication state monitoring part 105 judges whether or not a communication using the radio communication part 101 can be performed based on a predetermined setting value. Then, the WLAN communication part 103 can be controlled so that an active state of the WLAN communication part 103 is stopped when a judgment is made that communication using the radio communication part 101 can be performed in the mobile device 100, and the active state of the WLAN communication part 103 is continued when a judgment is made that a communication using the radio communication part 101 cannot be performed. Since this makes it possible to stop the active state of the WLAN communication part 103 when the radio communication part 101 can communicate, power consumption by the active state of the WLAN communication part 103 can be reduced while securing a communication state of the radio communication part 101.

Also, according to the mobile device 100, the communication state monitoring part 105 can judge whether or not a communication using the radio communication part 101 can be performed based on whether or not radio field intensity detected by the radio communication part 101 is equal to or greater than a preset value or a packet loss value detected by the radio communication part 101 is equal to or smaller than a setting value. This makes it possible to judge whether or not the radio communication part 101 can communicate with high precision and thus to reduce power consumption by the active state of the WLAN communication part 103.

Also, according to the mobile device 100, when the communication state monitoring part 105 judges that a communication using the radio communication part 101 can be performed, the communication state profile part 107 can predict a future communication state by the radio communication part 101 to further judge whether or not a communication using the radio communication part 101 can be performed. This makes it possible to judge, even though a communication using the radio communication part 101 can be performed at this time, whether or not the communication can be performed based on a result of predicting a future communication state and thus to reduce power consumption while securing a communication state.

Also, according to the mobile device 100, a future communication state can be predicted based on a history of the radio field intensity or the packet loss value detected by the radio communication part 101. This enables prediction of a future communication state with high precision.

Besides, in the above operation effects, when the WLAN communication part 103 can communicate, the radio communication part 101 may be caused to transit to the sleep state.

What is claimed is:

1. A communication terminal, comprising:
a first communication means for performing a communication by a first communication system;
a second communication means for performing a communication by a second communication system;
a judgment means for judging whether or not the communication using the first communication means can be performed based on a preset value; and
a control means for controlling the second communication means so that an active state of the second communication means is stopped when the judgment means initially judges that the communication using the first communication means can be performed due to a radio field intensity of the first communication means being equal to or above the preset value, and the active state of the second communication means is turned on or continued when the judgment means initially judges that the communication using the first communication means cannot be performed due to the radio field intensity of the first communication means being below the preset value,
wherein, the judgment means, when initially judging that the communication using the first communication means can be performed due to the radio field intensity of the first communication means being equal to or above the preset value, further determines if the radio field intensity of the first communication means is in an increase trend or a decrease trend, and when the judgment means determines that the radio field intensity is in a decrease trend the judgment means predicts whether or not the radio field intensity will be equal to or smaller than a predetermined value at a later point in time, and when the judgment means predicts that the radio field intensity will be equal to or smaller than the predetermined value at the later point in time, the control means performs communication connection processing for searching for an access point to which the second communication means belongs without the communication terminal switching from performing communication by the first communication means to the second communication means.

2. The communication terminal according to claim 1, wherein the judgment means judges whether or not the communication using the first communication means can be performed, based on whether or not radio field intensity detected by the first communication means is equal to or greater than the preset value, or whether or not a packet loss value detected by the first communication means is equal to or smaller than a setting value.

3. The communication terminal according to claim 1, wherein when the judgment means initially judges that the communication using the first communication means cannot be performed due to the radio field intensity of the first communication means being below the preset value, the judgment means further determines if the radio field intensity of the first communication means is in an increase trend or a decrease trend, and when the judgment means determines that the radio field intensity is in an increase trend, the judgment means predicts whether or not the radio field intensity will be equal to or greater than a predetermined value at a later point in time, and when the judgment means predicts that the radio field intensity will be equal to or greater than the predetermined value at the later point in time, the control means controls the second communication means so that an active state of the second communication means is stopped.

4. The communication terminal according to claim 1, wherein the judgment means determines if the radio field intensity of the first communication means is in an increase trend or a decrease trend based on a history of the radio field intensity detected by the first communication means.

5. The communication terminal according to claim 1, wherein the judgment means predicts whether or not the radio field intensity will be equal to or smaller than the predetermined value at a later point in time based on a decreased average value.

6. The communication terminal according to claim 1, wherein the judgment means predicts whether or not the radio field intensity will be equal to or smaller than the predetermined value at the later point in time by determining whether or not the radio field intensity will be equal to or smaller than a first preset value at a later point in time, and when the judgment means determines that the radio field intensity will be equal to or smaller than the first preset value at the later point in time, the judgment means determines whether or not the radio field intensity will be equal to or smaller than a second preset value which is smaller than the first preset value at the later point in time, and if the judgment determines that the radio field intensity will be equal to or smaller than the second preset value at the later point in time, the control means performs communication connection processing for an access point to which the second communication means belongs.

7. The communication terminal according to claim 6, wherein if the judgment means determines that the radio field intensity will be greater than the first preset value or the second preset value at the later point in time, the control means continues or turns on the active state of the second communication means.

8. A communication method implemented in a communication terminal having a first communication means for performing a communication by a first communication system and a second communication means for performing a communication by a second communication system, the communication method comprising:
  a judgment step of judging, at the communication terminal, whether or not the communication using the first communication means can be performed based on a preset value; and
  a control step of controlling, at the communication terminal, the second communication means so that an active state of the second communication means is stopped when the judgment step initially judges that the communication using the first communication means can be performed due to a radio field intensity of the first communication means being equal to or above the preset value, and the active state of the second communication means is turned on or continued when the judgment step judges that the communication using the first communication means cannot be performed due to the radio field intensity of the first communication means being below the preset value,
wherein, when initially judging that the communication using the first communication means can be performed due to the radio field intensity of the first communication means being equal to or above the preset value, determining if the radio field intensity of the first communication means is in an increase trend or a decrease trend, and when determining that the radio field intensity is in a decrease trend, predicting whether or not the radio field intensity will be equal to or smaller than a predetermined value at a later point in time, and when predicting that the radio field intensity will be equal to or smaller than the predetermined value at the later point in time, performing communication connection processing for searching for an access point to which the second communication means belongs without the communication terminal switching from performing communication by the first communication means to the second communication means.

9. A communication terminal, comprising:
  a first communication unit configured to perform a communication by a first communication system;
  a second communication unit configured to perform a communication by a second communication system;
  a judgment unit configured to judge whether or not the communication using the first communication unit can be performed based on a preset value; and
  a control unit configured to control the second communication unit so that an active state of the second communication unit is stopped when the judgment unit initially judges that the communication using the first communication unit can be performed due to a radio field intensity of the first communication means being equal to or above the preset value, and the active state of the second communication unit is turned on or continued when the judgment unit initially judges that the communication using the first communication unit cannot be performed due to the radio field intensity of the first communication means being below the preset value,
wherein, the judgment unit, when initially judging that the communication using the first communication unit can be performed due to the radio field intensity of the first communication unit being equal to or above the preset value, further determines if the radio field intensity of the first communication unit is in an increase trend or a decrease trend, and when the judgment unit determines that the radio field intensity is in a decrease trend the judgment unit predicts whether or not the radio field intensity will be equal to or smaller than a predetermined value at a later point in time, and when the judgment unit predicts that the radio field intensity will be equal to or smaller than the predetermined value at the later point in time, the control unit performs communication connection processing for searching for an access point to which the second communication unit belongs without the communication terminal switching from performing communication by the first communication unit to the second communication unit.

* * * * *